United States Patent
Anantharam et al.

(10) Patent No.: US 9,430,545 B2
(45) Date of Patent: Aug. 30, 2016

(54) MECHANISM FOR COMMUNICATION IN A DISTRIBUTED DATABASE

(71) Applicant: International Business Machines Corporation, Armonk, NY (US)

(72) Inventors: Sushma Anantharam, Cupertino, CA (US); Amitabha Biswas, San Francisco, CA (US); Nirapada Ghosh, Sunnyvale, CA (US); Harshad S. Padhye, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 14/058,327

(22) Filed: Oct. 21, 2013

(65) Prior Publication Data

US 2015/0112955 A1    Apr. 23, 2015

(51) Int. Cl.
*G06F 17/30*    (2006.01)

(52) U.S. Cl.
CPC ... *G06F 17/30575* (2013.01); *G06F 17/30371* (2013.01)

(58) Field of Classification Search
None
See application file for complete search history.

(56) References Cited

U.S. PATENT DOCUMENTS

| | | | |
|---|---|---|---|
| 5,970,488 A * | 10/1999 | Crowe | G06F 17/30575 707/656 |
| 7,500,020 B1 * | 3/2009 | Kabra et al. | 709/248 |
| 7,831,735 B1 * | 11/2010 | Kabra et al. | 709/248 |
| 8,935,206 B2 * | 1/2015 | Aguilera et al. | 707/638 |
| 2002/0016792 A1 * | 2/2002 | Ito | G06F 3/0601 |
| 2002/0129129 A1 | 9/2002 | Bloch et al. | |
| 2005/0027947 A1 | 2/2005 | Landin | |
| 2005/0125461 A1 * | 6/2005 | Filz | 707/203 |
| 2005/0192932 A1 | 9/2005 | Kazar et al. | |
| 2008/0256138 A1 | 10/2008 | Sim-Tang | |
| 2009/0063582 A1 * | 3/2009 | Anna | H04L 69/24 |
| 2011/0178985 A1 * | 7/2011 | San Martin Arribas et al. | 707/636 |
| 2012/0011098 A1 * | 1/2012 | Yamada | 707/623 |
| 2012/0017037 A1 | 1/2012 | Riddle et al. | |
| 2013/0036092 A1 * | 2/2013 | Lafont et al. | 707/634 |
| 2013/0346365 A1 * | 12/2013 | Kan et al. | 707/610 |

OTHER PUBLICATIONS

"Freescale ZigBee™ Cluster Library (ZCL)", Reference Manual, Document No. ZCLRM Rev. 1.2 Dec. 2008, © Freescale Semiconductor, Inc. 2006, 2007, 2008, <www.freescale.com>.

IBM, "DOVE DCS Cluster Convergence", Copyright 2011 IBM Corporation.

* cited by examiner

*Primary Examiner* — James Trujillo
*Assistant Examiner* — Aida Tessema
(74) *Attorney, Agent, or Firm* — Nicholas L. Cadmus; William H. Hartwell

(57) ABSTRACT

In a method for providing communication integrity within a distributed database computer system, a first node of a plurality of nodes transmits a change notification to a second node of the plurality of nodes. The second node is a neighbor of the first node. The first node receives at least one change confirmation from the second node. The change confirmation confirms acknowledgment of the change notification by the second node and by a third node of the plurality of nodes. The third node is not a neighbor of the first node. Responsive to receiving the at least one change confirmation, the first node determines that all the plurality of nodes have acknowledged the change notification.

16 Claims, 5 Drawing Sheets

DATA OWNERSHIP PROGRAM — 170a

MECHANISM FOR COMMUNICATION IN A DISTRIBUTED DATABASE

FIELD OF THE INVENTION

The present invention relates generally to the field of distributed computing and more particularly to communication confirmation within a network.

BACKGROUND OF THE INVENTION

In recent years, distributed network communication protocols have gained prominence as a methodology for designing robust and scalable communication schemes in large distributed systems. Each node computer on the network selects some other node computer as a communication partner at random, or in a predetermined fashion, and shares information. When one computer communicates with another, the state of at least one computer changes to reflect the state of the other. Information passes along, in predetermined paths, or randomly, until all the computers are exposed to the information. The power of a distributed network communication protocol lies in its robust ability to spread information.

A database is an integrated collection of data records, files, and other database objects needed by an application. Database objects are stored in database tables that are accessible to a user. A database management system ("DBMS") is the software that controls the creation, maintenance, and the use of a database. The DBMS handles user queries for data.

A distributed database is a database that consists of two or more data files located at different sites on a computer network. Because the database is distributed, different users can access it without interfering with one another. Distributed databases can have the same information duplicated on many sites. Duplication allows users to access the information from more than one site, possibly located around the world; thus relieving one site from being inundated with user requests concerning one piece of information. However, the distributed database environment must be periodically synchronized to make sure that all the nodes have consistent data.

SUMMARY

Aspects of an embodiment of the present invention disclose a method, computer program product, and computing system for providing communication integrity within a distributed database computer system. A first node of a plurality of nodes transmits a change notification to a second node of the plurality of nodes, wherein the second node is a neighbor of the first node. The first node of the plurality of nodes receives at least one change confirmation from the second node, the change confirmation confirming acknowledgment of the change notification by the second node and by a third node of the plurality of nodes, wherein the third node of the plurality of nodes is not a neighbor of the first node of the plurality of nodes. Responsive to receiving the at least one change confirmation, the first node of the plurality of nodes determines that all the plurality of nodes have acknowledged the change notification.

DETAILED DESCRIPTION

Figure 1:
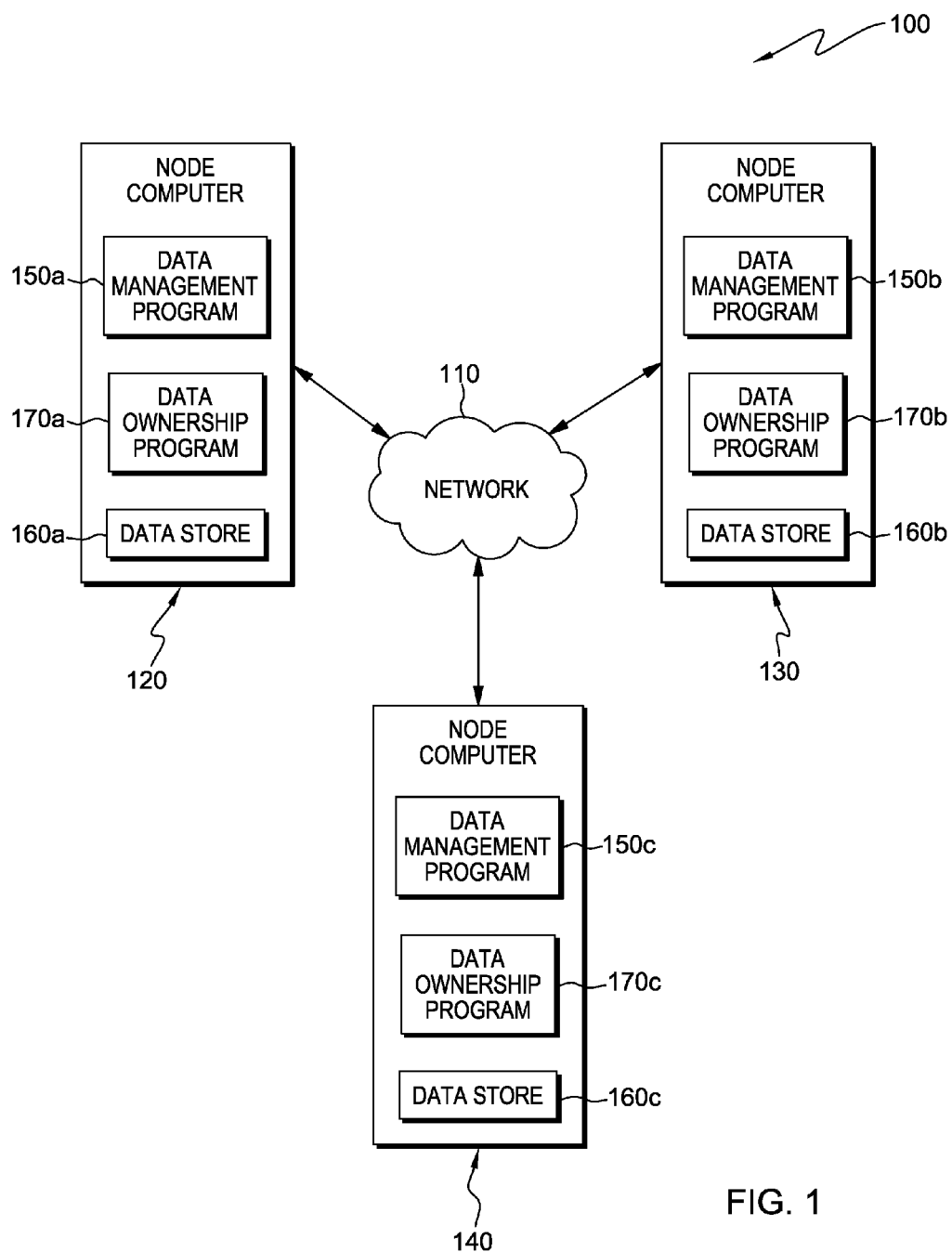
FIG. 1 is a diagram of a distributed data processing environment in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. The following Figures provide an illustration of one embodiment. The embodiment, taken in part or in whole, does not imply any limitations with regard to the environments in which different embodiments may be implemented.

FIG. 1 depicts a diagram of distributed data processing environment 100 in accordance with one embodiment of the present invention. Distributed data processing environment 100 includes node computers 120, 130, and 140 all interconnected over network 110. Network 110 may be a local area network (LAN), a wide area network (WAN) such as the Internet, any combination thereof, or any combination of connections and protocols that will support communications among node computers 120, 130, and 140, in accordance with embodiments of the invention. Network 110 may include wired, wireless, or fiber optic connections. In one embodiment, network 110 topology is hierarchical. In other embodiments, the topology includes, but not limited to: (i) bus; (ii) ring; (iii) star, (iv) tree; (v) mesh; or (vi) any combination of such. Distributed data processing environment 100 may include additional node computers or other devices not shown.

Node computers 120, 130, and 140 may each be a management server, a web server, or any other electronic device or computing system capable of receiving and sending data. In other embodiments, node computers 120, 130, and 140 may represent a server computing system utilizing multiple computers as a server system, such as in a cloud computing environment. In another embodiment, node computers 120, 130, and 140 may each be a laptop computer, tablet computer, netbook computer, personal computer (PC), a desktop computer, a personal digital assistant (PDA), a smart phone, or any programmable electronic device capable of receiving and sending data.

In one embodiment, node computers 120, 130, and 140 are servers in a distributed database. A distributed database application processing system may commonly be referred to as a "client-server" database application system. A distributed database is a set of databases stored on multiple computers that appears as a single database to applications accessing the information. Node computers 120, 130, and 140 can host a plurality of databases. In other embodiments, node computers 120, 130, and 140 include, but not limited to: (i) client computers; (ii) administration computers; (iii) backup computers, (iv) and database replication computers. The distributed database may be homogeneous or heterogeneous with respect to database applications.

Node computers 120, 130, and 140 contain data management programs 150a, 150b, and 150c, data stores 160a, 160b, and 160c, and data ownership programs 170a, 170b, and 170c, respectively.

Data management programs 150a, 150b, and 150c are software programs that control the flow of data, as in: update data, delete data, store data, retrieve data, and transfer in, and out data on node computers 120, 130, and 140, respectively. A data management program, such as 150a, can enter and retrieve information to and from a computer managed data store, such as 160a. Data management programs 150a, 150b, and 150c also communicate, bi-directionally, with: (i) other nodes on the network; (ii) a node computer's data ownership program through the associated node computer's data management program, and (iii) to a node computer's data store through the associated node computer's data management program.

In one embodiment, data management programs 150a, 150b, and 150c are database applications. A database application has the ability to communicate with other databases on a network. The communication would include retrieving and modifying data on another node's data store through the other node's associated data management program.

In some embodiments, database applications are referred to as "business applications" which are software applications that utilizes databases for specific purposes; examples include: (i) engineering data or economic models; (ii) library systems; (iii) flight reservation systems; and (iv) computerized parts inventory systems.

In another embodiment, a data management program is a database management system (DBMS). A database management system is a software system designed to allow the definition, creation, querying, update, and administration of databases.

Data stores 160a, 160b, and 160c are information repositories. Data management programs 150a, 150b, and 150c have access to data store 160a, 160b, and 160c, respectively. Data store 160a, 160b, and 160c may exist on computer-readable media, formerly described. In one embodiment, data stores 160*a*, 160*b*, and 160 are databases. Database model embodiments include, but are not limited to: (i) hierarchical database model; (ii) network model; (iii) relational model; (iv) entity-relationship model; (v) object model; (vi) document model; and (vii) object-relational model.

Data ownership programs 170*a*, 170*b*, and 170*c* operate to provide strong consistency in terms of confirmation of a change in the state of a node. Data ownership programs 170*a*, 170*b*, and 170*c* contain software to achieve network communication integrity. Data ownership programs 170*a*, 170*b*, and 170*c* have access to data store 160*a*, 160*b*, and 160*c*, respectively.

In one embodiment of the present invention, data ownership programs 170*a*, 170*b*, and 170*c*, are software programs that are invoked whenever a notification, usually referred to as a message, relating to the attribute table or version table is received and terminate when processing is complete. In other embodiments, data ownership programs 170*a*, 170*b*, and 170*c*, are invoked once and execute using software instructions to suspend themselves and awake themselves when processing is resumed. Data ownership programs 170*a*, 170*b*, or 170*c* process could awake periodically, such as once every second, or be event driven, such as when a message arrives.

In one embodiment of the present invention, data ownership programs 170*a*, 170*b*, and 170*c* each maintain two tables: one table called the attribute table, and another table called the version table. The attribute table (see FIG. 3A, ref. 300*a*, for an example) contains information that indicates which network node owns a particular attribute. The version table (see FIG. 3A, ref. 310*a*, for an example) keeps track a node computer's version. In one embodiment, the tables are kept in the associated data store, such as data store 160*a*. In another embodiment, the tables are maintained with internal variables within the associated data ownership program. In another embodiment, the tables are maintained in operating system variables, such as environmental variables. In still another embodiment, the tables are maintained by separate pieces of software (not shown), or even on another computer, provided the tables are accessible by the associated data ownership program. The implementation of the tables includes, but is not limited to: (i) flat file; (ii) a spreadsheet; (iii) a database; and (iv) an XML (eXtensible Markup Language) document.

In one embodiment, the attributed table row includes: (i) the node id of the originating node; (ii) the node version number of the originating node; and (iii) any attributes that are owned by the originating node. The version table row includes: (i) the node id of the originating node; and (ii) version numbers for each of the nodes on the network. In other embodiments, the attribute table row or the version table columns will be in a different order. In other embodiments, the message, or notification, containing the attribute table row and the version table row can include other information that may or may not be pertinent to the present invention, such as who sent the message, the time the message was sent, and data integrity information. Sending the message can be performed immediately, every 5 minutes, or when a queue is full.

In one embodiment, a node computer takes ownership of an attribute. The attribute table is updated to: (i) add the name of the attribute and, (ii) increment the version of the node. Examples names of the attributes include, but are not limited to: (i) name, such as, AttrP; (ii) a description, such as for example, information on elephants in Africa or any other topic of interest; (iii) identification, such as, 420xLo, which can be referenced to information on elephants in Africa; or (iv) any combination of (i) through (iii) or additional information that identifies an attribute. Additionally, for this embodiment, the version table is updated by incrementing the appropriate version number. For instance, when the version number is 10, the next version number is 11. Other embodiments will have numerical values be represented by enumerations, such as: 1, 2, 3, represented by A, B, C, respectively. For example, the next enumeration of A is B.

Node computer neighbors (other node computers) can be determined, as someone of having ordinary skill in the art would recognize, by: (i) using hashing tables; (ii) using nearest neighbor algorithms; (iii) using a file of urls (uniform resource names); or (iv) using another program, possibly stored and executed on another node, to determine the set of neighbors.

Communication integrity is a guarantee that a registering node has determined that an entire plurality of nodes on a network have registered a state change for an originating node. In one embodiment, a state change (sometimes referred to as an "event") is a change of ownership of an attribute in a database on the originating node. In one embodiment, a node may either take ownership of an attribute or disown an attribute. An important concept is that an event only identifies a state change in an originating node; and thus, in one embodiment, the change of ownership signifies an event, but an event does not signify a change of ownership.

The originating node is the node in which a state change has occurred. Eventually the entire plurality of nodes on a network recognize the state change in the originating node and communicate that recognition to the registering node. The registering node is the node that determines that the entire plurality of nodes have recognized and acknowledged a state change in the originating node. This registering node can be any node in the plurality of nodes. The originating node is the only node that knows which event is mapped to which operation. The communication sequence among the plurality of nodes on a network is arbitrary and varied. In one embodiment the plurality of nodes on a network communicate in unison. In other embodiments the plurality of nodes communicate one-at-time and their communication is received by the registering node asynchronously. In one embodiment, the originating node and the registering node are identical. In other embodiments, the originating node and the registering node are separate. In still other embodiments, the originating node or the registering node is a group of nodes.

An attribute in a distributed database, as someone in the arts would recognize, is a category of data or grouping of data. For example, one attribute is information on cars in the United States; another attribute is information on elephants in Africa. There may be a significant amount of data in the distributed database about elephants in Africa, but the category is the attribute, not the data itself. Ownership of the attribute concerning information on elephants in Africa may have existed on another node (or several nodes) or may never have existed before in the database. Ownership of the attribute concerning information on elephants in Africa can exist on many nodes simultaneously.

An analogy for communication integrity is that of communicating information to a group of people with five members: A, B, C, D, and E. An arbitrary topology for this group of five members starts with A communicating with B and B communicating with A. A member's neighbor is one that will receive information directly from another member, thus, in this example, A is a neighbor of B and B is a neighbor of A. This is an example of bidirectional communication and is represented by the symbol "↔," thus A↔B. Further, to complete the arbitrary topology, B↔C, B↔D, and B↔E. Accordingly, A can only communicate with the other members through B. An event occurs in which A takes ownership of the attribute concerning information on a topic and wants to verify that all members of the group know that information. In this case, A is both the originating node "member" and the registering node "member." A talks to B and tells him that an event has occurred to her. B in-turn talks to C, D, and E and tells them that an event has occurred to A. C, D, and E acknowledge to B that they understand that some event has occurred with A. B tells A that D, D, E, and he understand that A has changed state. At this point, A can determine that the group of five knows that A has had a state change, and is somehow different.

In another embodiment, B communicates immediately back to A concerning the event. In this other embodiment, A knows that B knows about the event, but not C, D, and E. Eventually, B tells C, D, and E, (one-by-one or as a group) about the event and when they acknowledge the event back to B, B completes the communication back to A.

Data ownership programs 170a, 170b, and 170c contain software to accomplish registering node processing and processing for the plurality of nodes between the originating node and the registering node. Data ownership programs 170a, 170b, and 170c communicate, bi-directionally, with associated data management programs 150a, 150b, and 150c, so that the associated data store is accessible by the data ownership program. Data ownership programs can determine that the entire plurality of nodes has recognized and acknowledged an occurrence of an event.

One example of an occurrence of an event is as follows. Suppose that node computer 120 owns the attribute concerning information on elephants in Africa. Data ownership program 170a responds to an event indicating the attribute concerning information on elephants in Africa is to be deleted from node computer 120. Data ownership program 170a sends information about the event (a state change in node computer 120) to neighboring nodes via data management program 150a. Each of the plurality of nodes on the network sends the state change of node computer 120 to their neighbors. At least one of the plurality of nodes on the network communicate back to node computer 120 about the state change. Eventually, when all nodes have acknowledged the event on node computer 120, data ownership program 170a registers that all nodes are up to date and deletes node computer 120 ownership of the attribute concerning information on elephants in Africa. In one embodiment, data ownership program 170a contains software to modify ownership when communication integrity is achieved within the associated data store, in the above example the data store is data store 160a. In another embodiment, data ownership program 170a acts as a gate, possibly utilizing a semaphore mechanism, to prevent the event from concluding until communication integrity is achieved.

Another example of an occurrence of an event is as follows. Suppose that node computer 120 (see FIG. 1) does not own the attribute concerning information on elephants in Africa. Data ownership program 170a responds to an event indicating concerning information on elephants in Africa is to be added to node computer 120. Data ownership program 170a sends information about the event (a state change in node computer 120) to neighboring nodes via data management program 150a. Each of the plurality of nodes on the network sends the state change of node computer 120 to their neighbors. At least one of the plurality of nodes on the network communicate back to node computer 120 about the state change. When all nodes have acknowledged the event on node computer 120, data ownership program 170a registers that all nodes are up to date and adds node computer 120 ownership of the attribute concerning information on elephants in Africa. In one embodiment, data ownership program 170a contains software to modify ownership when communication integrity is achieved within the associated data store, in the above example the data store is data store 160a. In another embodiment, data ownership program 170a acts as a gate, possibly utilizing a semaphore mechanism, to prevent the event from concluding until communication integrity is achieved.

Figure 2A:
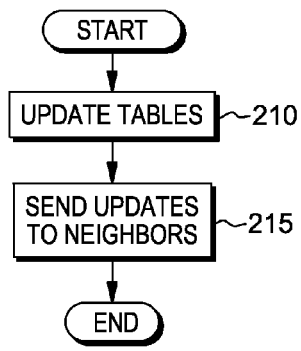
FIGS. 2A, 2B, and 2C are flowcharts depicting operational steps of data ownership programs for determining and providing communication integrity of an associated node computer, in accordance with one embodiment of the present invention.
Figure 2B:
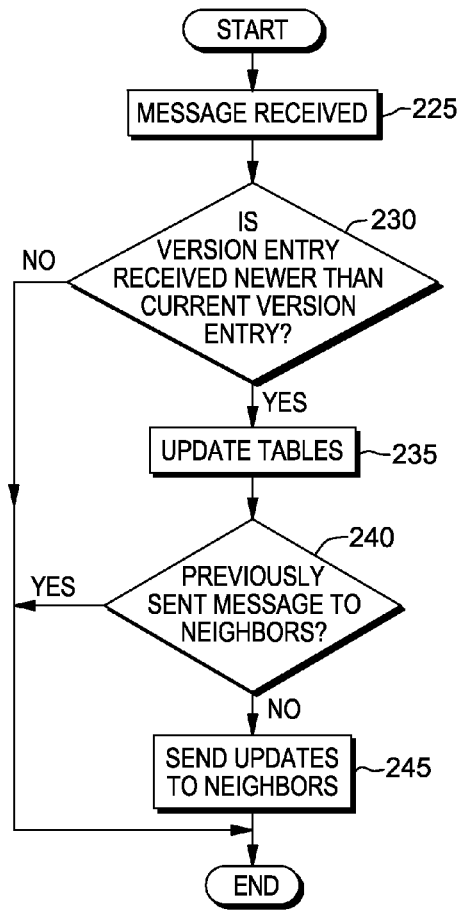
Figure 2C:
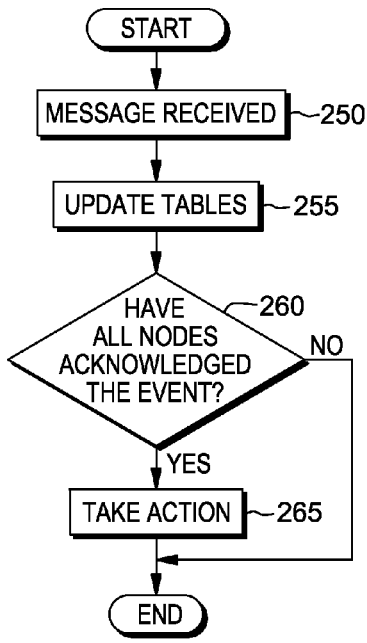

FIGS. 2A, 2B, and 2C are flowcharts depicting operational steps of data ownership programs 170a, 170b, and 170c for determining and providing communication integrity of the associated node computers, in accordance with one embodiment of the present invention. FIG. 2A describes one embodiment of operational steps that execute on the originating node. FIG. 2B describes one embodiment of operational steps that execute on one or more nodes on the network including neither the registering node nor the originating node. Each computer node on the network contains a data ownership program, however, for readability, only data ownership program 170b will be referenced when referring to intermediate computer nodes. FIG. 2C describes one embodiment of operational steps that execute on the registering node.

In this example of the present invention, one of the node computers is both the registering node and the originating node. In this example, the originating node and the registering node are computer node 120 (see FIG. 1).

In this example, an event triggers a need for computer node 120 to communicate its state change to the rest of the nodes on the network. The event is a change in state of computer node 120. The event indicates either taking ownership of an attribute or disowning an attribute. How the ownership changed is not significant, what is significant is a change in state of computer node 120.

An event occurs on node computer 120. The event was generated, as someone skilled in the arts would recognize, either on computer node 120 or passed to computer node 120, via network 110. The event indicates either taking ownership of an attribute or to disown an attribute. The event triggers the invocation of data ownership program 170a to execute the operational steps of FIG. 2A.

In step 210 (FIG. 2A), originating node processing, data ownership program 170a updates the attribute table and version table. In this embodiment, an update includes accessing data store 160a to modify the rows on the appropriate table. An example of updating an attribute table and a version table is discussed in detail in FIGS. 3A through 3E.

In step 215, data ownership program 170a sends the updates to its neighbors. Data ownership program 170a sends the changed attribute table row and the changed version table row to the originating node's neighbors. In this embodiment, only the row change of each table is sent. After sending is complete, data ownership program's 170a process terminates.

Turning to FIG. 2B, in step 225, data ownership program 170b, computer node 130, receives a notification, in the form of a computer networking message. Data ownership program 170b and data ownership program 170c, computer node 140, each receives a message, however, for readability, only data ownership program 170b will be referenced in FIG. 2B's operational steps. Receiving a message, by node 130, invokes data ownership program 170b. The message was sent by the originating node, computer node 120, or another computer node on the network. The message is about the event that occurred on the originating node. The message contains an attribute table row and a version table row. The message can contain other less pertinent information, such as, who sent the message, the time the message was sent, and data integrity information.

In decision step 230, data ownership program 170b determines if the version number sent in the message is newer than what is currently contained in the version table. Data ownership program 170b accesses data store 160b to retrieve data ownership program's 170b version table. When the version number sent in the message is the same or older than the version number in data ownership program's 170b version table, data ownership program 170b terminates, by taking the "no" path. For instance, if the version number in the message is 10 and data ownership program's 170b version table is version number 10, data ownership program 170b terminates. When the version number sent in the message is newer than what is currently contained in data ownership program's 170b version table, data ownership program 170b transitions to step 235, by taking the "yes" path. For instance, if the version number in the message is 11 and data ownership program's 170b version table is version number 10, data ownership program 170b transitions to step 235. The method to determine if the version number sent in the message is newer than what is currently contained in the data ownership program's version table includes, but is not limited to: (i) a numerical comparison; (ii) an enumeration comparison; and (iii) calling a function that returns the determination.

In step 235, data ownership program 170b updates the attribute table and the version table to be up-to-date. This update includes storing the attribute table information and the version table information into data store 160b.

In decision step 240, data ownership program 170b determines whether data ownership program 170b sent the table information to its neighbors. When neighbors have been updated, data ownership program 170b takes the "yes" path and terminates. When neighbors have not been updated, data ownership program 170b takes the "no" path. Decision step 240 prevents generating unnecessary network traffic. For instance, when communication between the data ownership program and the neighbor's computer node is bi-directional the neighboring computer node will send the same information back, since the tables are up-to-date on the neighbor's computer node there is no need to resend the same information a second time. In other embodiments, the data ownership program 170b can be as simple as sending table (row) information to neighbors whenever an event causes a change (increase in version) in that node's row in the attribute or version tables.

In step 245, data ownership program 170b sends a notification to its neighbors. The attributed table row includes: (i) node id of the message-sending computer node; (ii) the node version number of the message-sending computer node; (iii) any attributes that are owned by the message-sending computer node. The version table row includes: (i) the node id of the message sending node; and (ii) version numbers for each of the nodes on the network as seen by message-sending node. In other embodiments, the attribute table row or the version table row are in a different order, or include other information that may or may not be pertinent to the present invention. After sending is complete, data ownership program's 170b process terminates.

Turing to FIG. 2C, step 250, data ownership program 170a, computer node 120, receives a message for the registering node. Receipt of a message, by node 120, invokes data ownership program 170a. The message was sent by an originating node (itself, in this example) or a computer node on the network. The message is about an event that occurred on the originating node. The message contains an attribute table row and a version table row. The message can contain other less pertinent information, such as, who sent the message, the time the message was sent, and data integrity information.

In step 255, data ownership program 170a updates the attribute table and the version table for computer node 120. Data ownership program 170a updates the attribute table and the version table to the correct version from the sending computer node's message data. The update is performed by storing attribute table and version table information into data store 160a.

In decision step 260, data ownership program 170a determines whether all the nodes in the network have acknowledged the event. In one embodiment, determining if all the nodes in the network have acknowledged the event is resolved when the registering node determines that the registering node's node ID column (FIG. 3A) in the version table is up-to-date and equal. An example of all nodes being up-to-date is the third column (labeled 130) in FIG. 3A, table 310a. In that example, computer node 130 is up-to-date because all rows are equal to 120 in the 130 column. Thus, from the point-of-view of the owning node of version table 310a (node 120 in this case) all network nodes have acknowledged that node 130 is at version 120. If data ownership program 170a determines that not every node in the network has acknowledged the event data ownership program 170a terminates. When data ownership program 170a determines that every node in the network has acknowledged the event, data ownership program 170a transitions to step 265.

In step 265, data ownership program 170a takes an action on the originating node. In one embodiment, an action includes deleting ownership of an attribute from the attribute table. In other embodiments, when the registering node is not the originating node a message is sent, via the data management program, to perform the action. Data ownership program's 170a process terminates.

FIGS. 3A, 3B, 3C, 3D, and 3E, taken together, is an example of one method to communicate to the plurality of computer nodes that an event concerning adding an attribute to an attribute table, in accordance with one embodiment of the present invention.

Figure 3A:
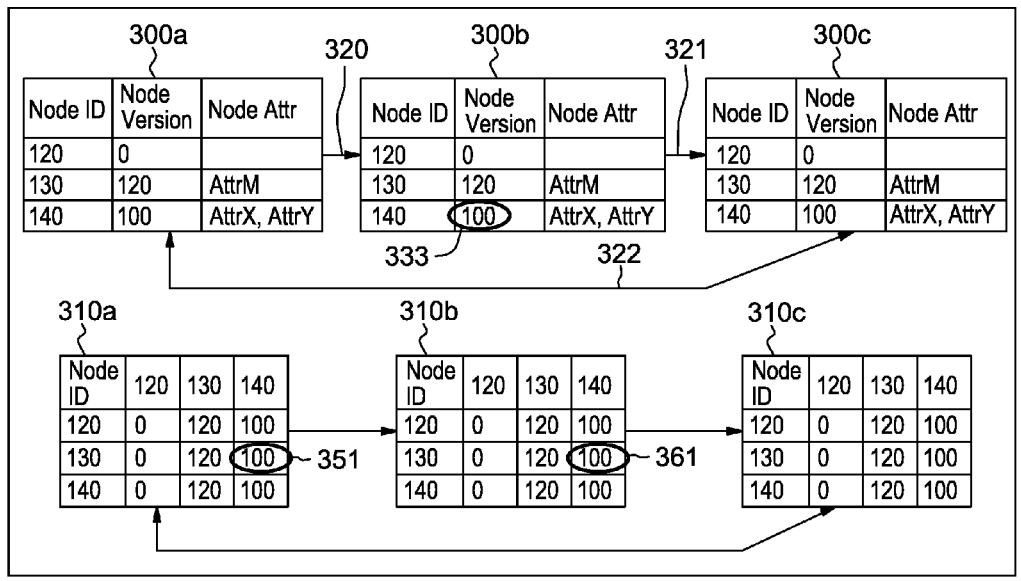
FIGS. 3A, 3B, 3C, 3D, and 3E, taken together, is an example of one method to communicate to the plurality of nodes that an event concerning adding an attribute to an attribute table, in accordance with one embodiment of the present invention.

With reference to FIG. 3A, attribute tables 300a, 300b, and 300c are an example of one embodiment for the three computer nodes 120, 130, and 140, respectively. Hereinafter, for readability, "computer node" may sometimes be referred to as "node." The attribute table can answer the question, what does node 130 believe is the version of node 140? The table of interest is table 300b (node 130's attribute table.) Read down the first column of table 300b until the 140's row is found. Read across the 140 row until column "Node Version" is reached. Node 130 believes that node 140 is at version 100, see reference 333.

Table 300a (attribute table for computer node 120) contains: (i) node ID 120's node version is 0 and owns no attributes; (ii) node ID 130's node version is 120 and owns attribute AttrM; (iii) node ID 140's node version is 100 and owns two attributes: AttrX and AttrY. Table 300b (attribute table for computer node 130) contains: (i) node ID 120's node version is 0 and owns no attributes; (ii) node ID 130's node version is 120 and owns attribute AttrM; (iii) node ID 140's node version is 100 and owns two attributes: AttrX and AttrY. Table 300c (attribute table for computer node 140) contains: (i) node ID 120's node version is 0 and owns no attributes; (ii) node ID 130's node version is 120 and owns attribute AttrM; (iii) node ID 140's node version is 100 and owns two attributes: AttrX and AttrY.

Version tables 310a, 310b, and 310c (see FIG. 3A) are an example of one embodiment of the version tables for the three nodes 120, 130, and 140, respectively. In this embodiment, the version tables are read by row first and across columns.

Table 310a (version table for node 120) contains: (i) node ID 120's node version (row 120) of node 120 (column 120) is 0; (ii) node ID 120's node version (row 120) of node 130 (column 130) is 120; (iii) node ID 120's node version (row 120) of node 140 (column 140) is 100. Continuing down the rows: (i) node ID 130's node version (row 130) of node 120 (column 120) is 0; (ii) node ID 130's node version (row 130) of node 130 (column 130) is 120; (iii) node ID 130's node version (row 130) of node 140 (column 140) is 100. Continuing on to the last row: (i) node ID 140's node version (row 140) of node 120 (column 120) is 0; (ii) node ID 140's node version (row 140) of node 130 (column 130) is 120; (iii) node ID 140's node version (row 140) of node 140 (column 140) is 100.

Tables 310b and 310c are identical to 310a. It is important to note that table 310a is node 120's view of the network state, table 310b is node 130's view of the network state, and table 310c is node 140's view of the network state. In other words, node 120's (table 310a) view of node 130 is based on row 130. For instance, node 120 (table 310a) believes that node 130 (row 130) has node 140 (column 140) at version level 100 (reference 351). This belief is correct. The conclusion can be determined by examining attribute table 300b, which is node 130's attribute table, as table 300b has node 140 at version at 100 (reference 333). In some embodiments, this conclusion can be reached by examining node 130's version table 310b, reference 361.

In this example embodiment, the network topology is: (i) node 120's neighbors are nodes 130 and 140 (references 320 and 322); (ii) node 130's neighbor is node 140 (reference 321); and (iii) node 140 neighbor is node 120 (reference 322). Node 120 sends messages to node 130 and node 140. Node 130 sends messages only to node 140. Node 140 sends messages only to node 120.

Figure 3B:
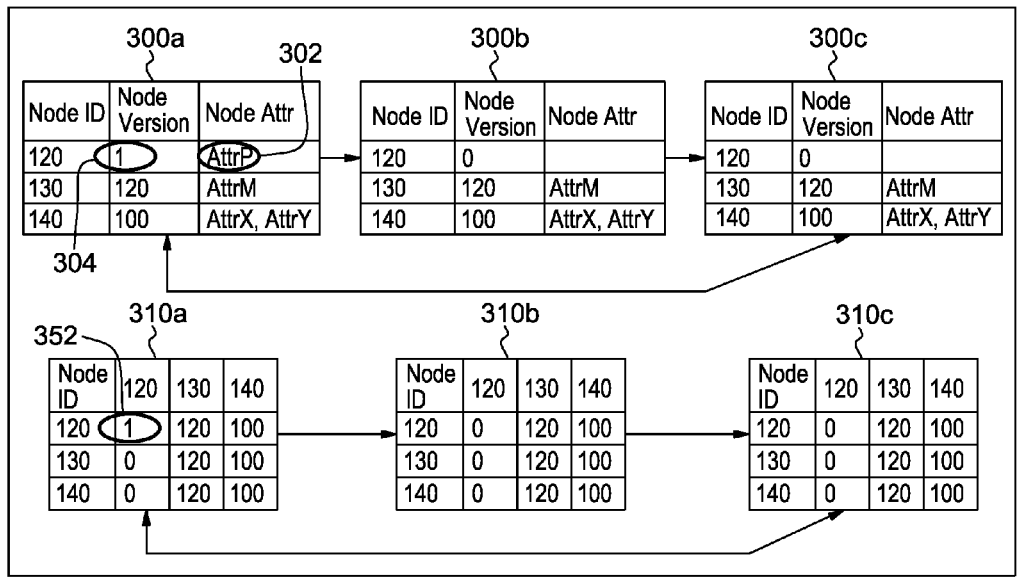

Referencing now FIG. 3B, an event occurs that makes node 120 an originating node. In this embodiment node 120 is also the registering node. The event is to add ownership of a new attribute, AttrP, to node 120. Table 300a (FIG. 3B), node 120's attribute table, has node 120's (row 120) node attribute set to AttrP, reference 302. Node 120's version is updated to version 1 to reflect node 120's state, reference 304. Node 120's version table is also updated to version 1 (reference 352). Node 120 sends the attribute table row and version table row to node 120's neighbors: nodes 130 and 140.

Figure 3C:
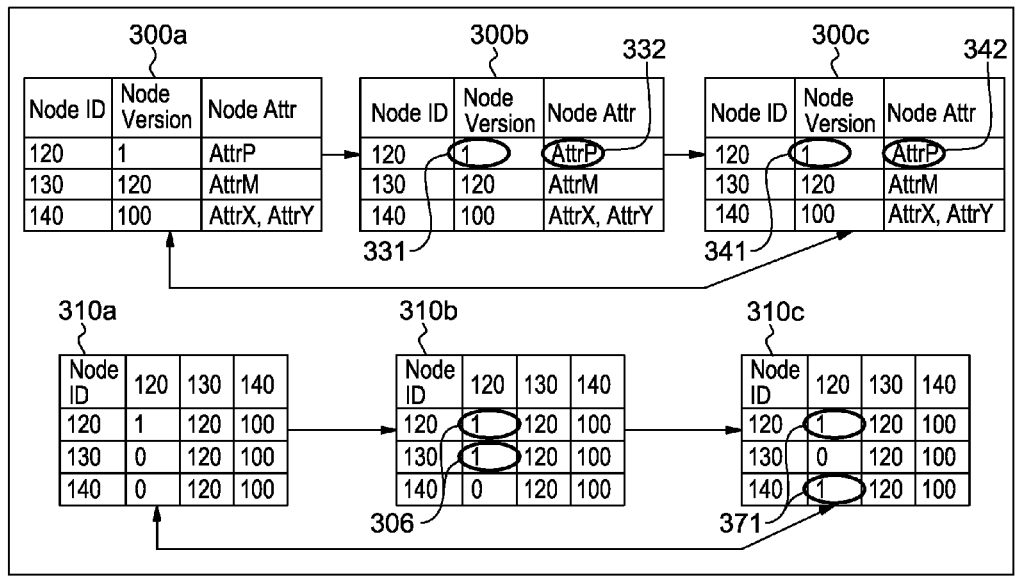

Turning to FIG. 3C, node 130 receives a message from its neighbor node 120. Node 130 realizes that node 120 has taken ownership of AttrP and changes the node version entry for node 120 in node 130's attribute table 300b to 1 (reference 331) and adds the attribute AttrP (reference 332). Node 130 also updates its version table 310b for row 120 and row 130 (reference 306). Node 140 performs a similar action as node 130 for node 140's attribute table and version table, tables 300c and 310c, respectively, according to references 341, 342, and 371. Nodes 130 and node 140 send the attribute row and version row to their neighbors: node 140 and node 120, respectively.

Figure 3D:
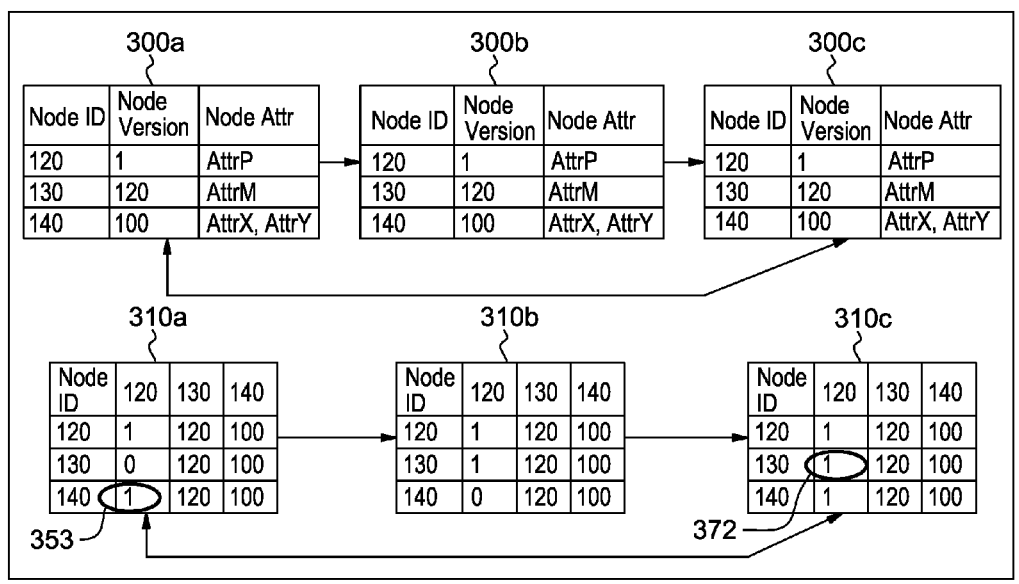

Turning to FIG. 3D, node 120 receives a message from its neighbor node 140. Node 120 updates node 140's information in its version table 310a (reference 353), while node 120's attribute table 300a remains unchanged, as it is up-to-date. Even though all nodes have been notified of the ownership change, node 120 only acknowledges that node 140 has received the change. At relatively the same time, node 140 receives a message from its neighbor node 130. Node 140 updates node 140 state of 130 in node 140's version table 310c (reference 372). Node 140 sends the version row for node 130 to node 140's neighbor, which is node 120.

Figure 3E:
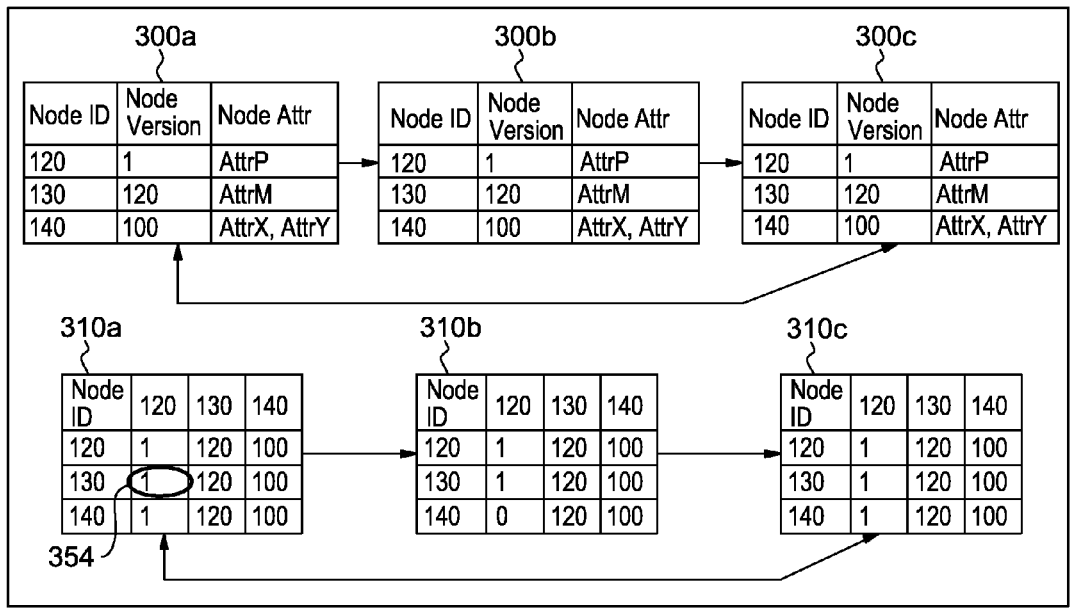

Turning to FIG. 3E, node 120 receives a message from its neighbor node 140. Node 120 updates its version table 310a with the information sent from node 140 (reference 354). The registering node, node 120, determines that all nodes have acknowledged the event the originating node (which is also the registering node).

Figure 4:
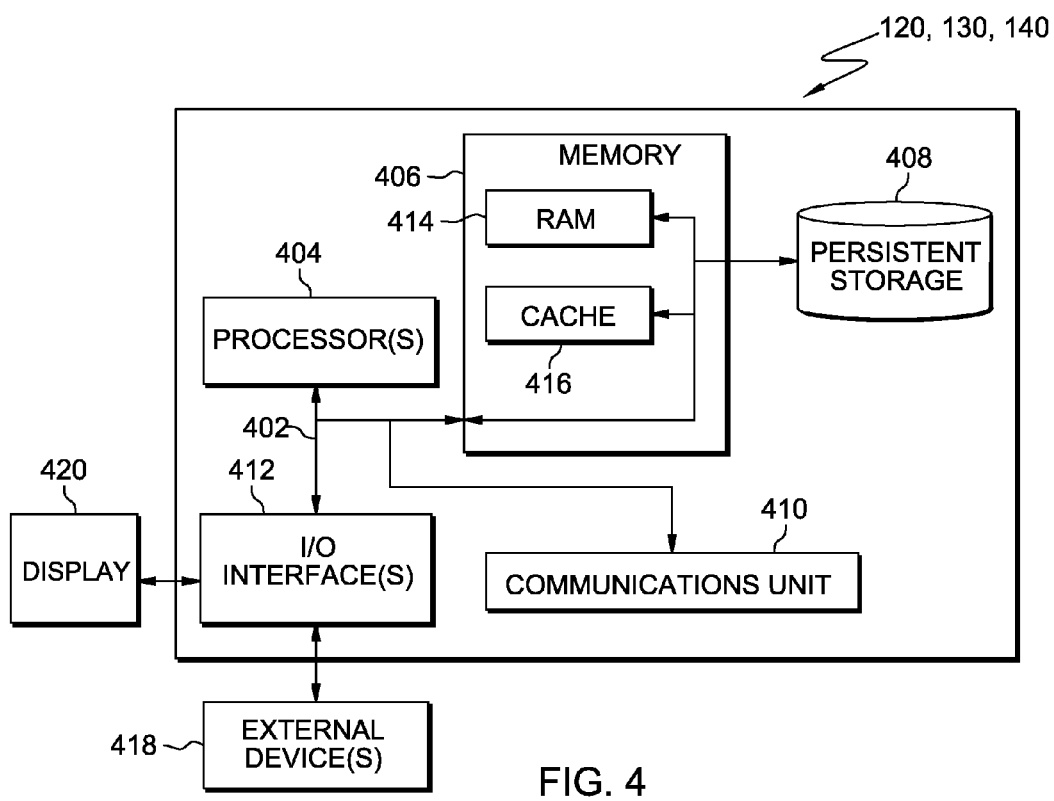
FIG. 4 depicts a block diagram of components of the node computers of FIG. 1 in accordance with one embodiment of the present invention.

FIG. 4 depicts a block diagram of components of node computers 120, 130, and 140 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Node computers 120, 130, and 140 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Data ownership program 170a is stored in persistent storage 408, of computer node 120, for execution and/or access by one or more of the respective computer processors 404 via one or more memories of memory 406. Data ownership program 170b is stored in persistent storage 408, of computer node 130, for execution and/or access by one or more of the respective computer processors 404 via one or more memories of memory 406. Data ownership program 170c is stored in persistent storage 408, of computer node 140, for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 110 and other devices (not shown). In these examples, communications unit 410 includes one or more network interface cards. Communications unit 410 may provide communications through the use of either or both physical and wireless communications links.

Data ownership program 170*a* may be downloaded to persistent storage 408, of computer node 120, through communications unit 410. Data ownership program 170*b* may be downloaded to persistent storage 408, of computer node 130, through communications unit 410. Data ownership program 170*c* may be downloaded to persistent storage 408, of computer node 140, through communications unit 410.

I/O interface(s) 412 allows for input and output of data with other devices that may be connected to node computers 120, 130, or 140. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., data ownership programs 170*a*, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for providing communication integrity within a distributed database computer system, the method comprising the steps of:
   transmitting, by a first node of a plurality of nodes, a change notification to a second node of the plurality of nodes, wherein the second node is a neighbor of the first node, and wherein the change notification indicates that the first node has changed from a first version to a second version;
   receiving, by the first node of the plurality of nodes, at least one change confirmation from the second node, the change confirmation confirming acknowledgment of the change notification by the second node and by a third node of the plurality of nodes, wherein the third node of the plurality of nodes is not a neighbor of the first node of the plurality of nodes;
   responsive to receiving the at least one change confirmation, determining, by the first node of the plurality of nodes, that all nodes of the plurality of nodes have acknowledged the change notification; and
   updating, by the first node of the plurality of nodes, a version table of the first node to show that the second node and the third node know that the first node has changed from the first version to the second version, wherein the version table of the first node shows the first node's knowledge about what the second node knows about the version of the first node and a version of the third node, and about what the third node knows about the version of the first node and a version of the second node.

2. The method of claim 1, wherein the step of receiving, by the first node of the plurality of nodes, at least one change confirmation from the second node includes receiving a change confirmation from each node of the plurality of nodes.

3. The method of claim 1, wherein the change confirmation confirming acknowledgment of the change notification by the second node and by the third node comprises a notification that the second node and the third node know that the first node has changed from the first version to the second version.

4. A computer program product for providing communication integrity within a distributed database computer system, the computer program product comprising:
   one or more computer-readable storage media and program instructions stored on the one or more computer-readable storage media, the program instructions comprising:
   program instructions to transmit, by a first node of a plurality of nodes, a change notification to a second node of the plurality of nodes, wherein the second node is a neighbor of the first node, and wherein the change notification indicates that the first node has changed from a first version to a second version;
   program instructions to receive, by the first node of the plurality of nodes, at least one change confirmation from the second node, the change confirmation confirming acknowledgment of the change notification by the second node and by a third node of the plurality of nodes, wherein the third node of the plurality of nodes is not a neighbor of the first node of the plurality of nodes;
   program instructions to, in response to receiving the at least one change confirmation, program instructions to determine, by the first node of the plurality of nodes, that all nodes of the plurality of nodes have acknowledged the change notification; and program instructions to update, by the first node of the plurality of nodes, a version table of the first node to show that the second node and the third node know that the first node has changed from the first version to the second version, wherein the version table of the first node shows the first node's knowledge about what the second node knows about the version of the first node and a version of the third node, and about what the third node knows about the version of the first node and a version of the second node.

5. The computer program product of claim 4, wherein the program instructions to receive, by the first node of the plurality of nodes, at least one change confirmation from the second node include program instructions to receive a change confirmation from each node of the plurality of nodes.

6. The computer program product of claim 4, wherein the change confirmation confirming acknowledgment of the change notification by the second node and by the third node comprises a notification that the second node and the third node know that the first node has changed from the first version to the second version.

7. A computer system for providing communication integrity within a distributed database computer system, the computer system comprising:

one or more computer processors, one or more computer-readable storage media, and program instructions stored on the computer-readable storage media for execution by at least one of the one of the one or more processors, the program instructions comprising:

program instructions to transmit, by a first node of a plurality of nodes, a change notification to a second node of the plurality of nodes, wherein the second node is a neighbor of the first node, and wherein the change notification indicates that the first node has changed from a first version to a second version;

program instructions to receive, by the first node of the plurality of nodes, at least one change confirmation from the second node, the change confirmation confirming acknowledgment of the change notification by the second node and by a third node of the plurality of nodes, wherein the third node of the plurality of nodes is not a neighbor of the first node of the plurality of nodes;

program instructions to, in response to receiving the at least one change confirmation, program instructions to determine, by the first node of the plurality of nodes, that all nodes of the plurality of nodes have acknowledged the change notification; and updating, by the first node of the plurality of nodes, a version table of the first node to show that the second node and the third node know that the first node has changed from the first version to the second version, wherein the version table of the first node shows the first node's knowledge about what the second node knows about the version of the first node and a version of the third node, and about what the third node knows about the version of the first node and a version of the second node.

8. The computer system of claim 7, wherein the program instructions to receive, by the first node of the plurality of nodes, at least one change confirmation from the second node include program instructions to receive a change confirmation from each node of the plurality of nodes.

9. The computer system of claim 7, wherein the change confirmation confirming acknowledgment of the change notification by the second node and by the third node comprises a notification that the second node and the third node know that the first node has changed from the first version to the second version.

10. The method of claim 1, wherein:

the plurality of nodes includes at least four nodes; and the version table of the first node shows the first node's knowledge about what each of the nodes in the plurality of nodes knows about versions of each of the other nodes in the plurality of nodes.

11. The method of claim 1, further comprising:

receiving, by the first node of the plurality of nodes, a change notification from the second node, wherein the change notification indicates that the second node has changed from a first version to a second version;

transmitting, by the first node of the plurality of nodes, a change confirmation to the second node, the change confirmation confirming acknowledgement of the received change notification.

12. The method of claim 11, further comprising:

updating, by the first node of the plurality of nodes, an attribute table of the first node to show that the second node has changed from the first version to the second version.

13. The method of claim 12, further comprising:

updating, by the first node of the plurality of nodes, the version table of the first node to show that the second node knows that the second node has changed from the first version to the second version.

14. The method of claim 1, further comprising:

receiving, by the first node of the plurality of nodes, a change notification of the third node from the second node, wherein the change notification indicates that the third node has changed from a first version to a second version;

transmitting, by the first node of the plurality of nodes, a change confirmation to the second node for transmission to the third node, the change confirmation confirming acknowledgement of the received change notification.

15. The method of claim 14, further comprising:

updating, by the first node of the plurality of nodes, an attribute table of the first node to show that the third node has changed from the first version to the second version.

16. The method of claim 15, further comprising:

updating, by the first node of the plurality of nodes, the version table of the first node to show that the second node and the third node know that the third node has changed from the first version to the second version.

* * * * *